US010428245B2

(12) United States Patent
Michaud et al.

(10) Patent No.: US 10,428,245 B2
(45) Date of Patent: Oct. 1, 2019

(54) MOISTURE- AND HEAT-CROSSLINKABLE POLYURETHANE-BASED ADHESIVE COMPOSITION COMPRISING A LOW CONTENT OF ISOCYANATE MONOMER

(71) Applicant: BOSTIK SA, La Plaine St Denis (FR)

(72) Inventors: Guillaume Michaud, Compiegne (FR); Frederic Simon, Pont l'eveque (FR)

(73) Assignee: BOSTIK SA, La Plaine St Denis (FR)

( * ) Notice: Subject to any disclaimer, the term of this patent is extended or adjusted under 35 U.S.C. 154(b) by 453 days.

(21) Appl. No.: 14/574,620

(22) Filed: Dec. 18, 2014

(65) Prior Publication Data
US 2015/0175850 A1 Jun. 25, 2015

(30) Foreign Application Priority Data
Dec. 19, 2013 (FR) ..................... 13 62993

(51) Int. Cl.
C09J 7/02 (2006.01)
C09J 7/38 (2018.01)
C08G 18/48 (2006.01)
C08G 18/75 (2006.01)
C08G 18/76 (2006.01)
C08G 18/78 (2006.01)
C08G 18/10 (2006.01)
C08G 18/30 (2006.01)
C09J 175/08 (2006.01)
C09J 175/04 (2006.01)
C08L 25/16 (2006.01)

(52) U.S. Cl.
CPC ............... *C09J 7/38* (2018.01); *C08G 18/10* (2013.01); *C08G 18/307* (2013.01); *C08G 18/4866* (2013.01); *C08G 18/755* (2013.01); *C08G 18/7621* (2013.01); *C08G 18/7837* (2013.01); *C09J 175/08* (2013.01); *C08G 2170/20* (2013.01); *C08G 2170/40* (2013.01); *C08L 25/16* (2013.01); *C09J 175/04* (2013.01); *C09J 2201/606* (2013.01); *C09J 2475/00* (2013.01); *Y10T 428/2896* (2015.01)

(58) Field of Classification Search
None
See application file for complete search history.

(56) References Cited

U.S. PATENT DOCUMENTS

| 4,661,542 | A  | * | 4/1987 | Gilch ..................... | C08G 18/10 524/157 |
| 6,303,731 | B1 |   | 10/2001 | Carlson et al. | |
| 6,884,852 | B1 | * | 4/2005 | Klauck ................. | C08G 18/10 525/457 |
| 7,309,753 | B2 | * | 12/2007 | Roesler ................. | C08G 18/12 528/26 |
| 2011/0052912 | A1 | * | 3/2011 | Poivet .................... | C08G 18/10 428/355 N |
| 2017/0088661 | A1 | * | 3/2017 | Michaud ............... | C08G 18/69 |

FOREIGN PATENT DOCUMENTS

JP    S53-21236 A    2/1978
WO    00/43432 A1    7/2000

OTHER PUBLICATIONS

Istvan, Benedek et al., "Pressure-Sensitive Adhesives Technology", 1997, Marcel Dekker, Inc., p. 93.*
Press Release, "FLO Power! Vencorex launches Tolonate X FLO 100 a new bio-based & low viscosity aliphatic isocyanate polymer", Mar. 19, 2013.*
EIC Search for claim 8, Apr. 7, 2017.*
Search Report dated Sep. 12, 2014 issued in corresponding FR 1362993 application (pp. 1-2).
Partial English Translation of JP S53-21236 A published Feb. 27, 1978.

* cited by examiner

*Primary Examiner* — Anish P Desai
(74) *Attorney, Agent, or Firm* — Millen, White, Zelano and Branigan, P.C.

(57) ABSTRACT

The present invention relates to a heat- and moisture-crosslinkable adhesive composition comprising:
a) from 40 to 60 wt % of at least one polyurethane obtainable by a polyaddition reaction of at least one particular diisocyanate with at least one polyether diol, with or without the presence of at least one reaction catalyst, at a reaction temperature T1 below 95° C., in anhydrous conditions, and in amounts of diisocyanate(s) and of polyether diol(s) leading to an NCO/OH molar ratio in the range from 1.6 to 1.9;
b) from 39 to 59 wt % of at least one compatible tackifying resin and
c) from 0.01 to 1 wt % of at least one crosslinking catalyst.
The present invention also relates to a method of preparing said adhesive composition, a self-adhesive support coated with the crosslinked adhesive composition and the use of said support for making labels and/or self-adhesive tapes.

10 Claims, No Drawings

US 10,428,245 B2

MOISTURE- AND HEAT-CROSSLINKABLE POLYURETHANE-BASED ADHESIVE COMPOSITION COMPRISING A LOW CONTENT OF ISOCYANATE MONOMER

The field of technology to which the object of the present application relates is the field of pressure-sensitive adhesives, crosslinked under the action of moisture and heat.

More precisely, the invention relates to a moisture- and heat-crosslinkable adhesive composition, comprising at least one particular polyurethane comprising two isocyanate end groups, at least one phenolic tackifying resin, and at least one crosslinking catalyst, notably with a particularly low content of isocyanate monomer; and a self-adhesive support coated with a pressure-sensitive adhesive consisting of said crosslinked composition. Said self-adhesive support is useful for the manufacture of labels and/or self-adhesive tapes.

Pressure-sensitive adhesives (PSAs) are substances conferring on the medium coated with them an immediate tackiness at room temperature (often termed "tack"), which allows its instantaneous adhesion to a substrate under the effect of brief, light pressure.

PSAs are widely used for making self-adhesive labels, which are fixed on articles for the purpose of providing information (such as a barcode, designation, price) and/or for decorative purposes. PSAs are also used for making self-adhesive tapes for various uses. We may mention for example, besides the transparent adhesive tape widely used in everyday life: forming and assembly of packaging cartons; protection of surfaces for painting, in the building industry; holding electric cables in place in the transport industry; gluing of fitted carpets with double-sided adhesive tapes.

For manufacturing labels and/or self-adhesive tapes, PSAs are often applied by continuous coating processes on the entire surface of a support layer (if necessary printable) of large dimensions, at the rate of an amount (generally expressed in g/m$^2$) and denoted below with the term "basis weight". The support layer consists of paper or of film of a polymer material with one or more layers. The layer of adhesive that covers the support layer may itself be covered with a protective non-stick layer (often called "release liner"), for example consisting of a silicone film. The multilayer system obtained is generally packaged by winding in the form of wide coils up to two meters in width and one meter in diameter, which can be stored and transported.

These multilayer systems may subsequently be converted into self-adhesive labels that can be applied by the end user, by methods of processing that include printing of the desired informative and/or decorative elements on the printable face of the support layer, and then cutting to the desired size and shape. The protective non-stick layer can easily be removed without altering the layer of adhesive, which remains fixed on the support layer. After separation of its protective non-stick layer, the label is applied on the article to be covered either manually, or using labelling machines on automated packaging lines.

These multilayer systems may also be transformed into self-adhesive tapes by cutting and packaging in rolls of specified width and length.

With their high tack at room temperature, PSAs allow rapid bonding or attachment of the self-adhesive label and/or tape on the substrate (or article) to be coated (for example, on bottles in the case of labels, or else, in the case of tapes, on packaging cartons that are to be formed), suitable for obtaining high industrial production rates.

In the context of the present application, we were interested in a particular category of PSAs: the HMPSAs (Hot Melt Pressure-Sensitive Adhesives), which are hot-melt adhesives that possess properties at least comparable to the PSAs, notably in terms of adhesive strength, tack and self-adhesion.

In general, the compositions based on these adhesives are solid or quasi-solid at room temperature, and have to be melted prior to deposition (or coating) on a support. After cooling and optionally crosslinking of the composition applied, the support is coated with an adhesive seal possessing high tack and adhesive power on various substrates.

The use of polymers of low molecular weight (or prepolymers) of the polyurethane type, crosslinkable by moisture and heat, in the preparation of hot-melt pressure-sensitive adhesives (HMPSAs), is known from the prior art. These polyurethanes are prepared by reaction of a polyol (generally a diol) with a variable stoichiometric excess of polyisocyanate (generally a diisocyanate). This stoichiometric excess may be translated by an NCO/OH molar ratio (called "NCO/OH ratio") strictly greater than 1, which corresponds to the molar ratio of the number of isocyanate groups (NCO) to the number of hydroxyl groups (OH) carried by the reactive species bearing such functions, used in the preparation of the polyurethane. Having adopted a given NCO/OH ratio, it is possible to react all the OH functions of the polyol or polyols so as to obtain a polyurethane comprising only isocyanate groups at the ends of the polymer chain. In this way a polyurethane comprising isocyanate end groups is obtained.

In the field of adhesives, such polyurethanes are called "reactive polyurethanes" or "NCO terminated polyurethane", in contrast to "OH terminated polyurethane" which denote polyurethanes in which the end groups are hydroxyl groups, which are not sensitive to moisture. These OH terminated polyurethanes are obtained using a stoichiometric excess of polyol relative to the amount of polyisocyanate, or an NCO/OH ratio strictly below 1, and are not moisture-crosslinkable owing to the absence of isocyanate end groups.

In the context of the present application, the aim is to provide compositions based on NCO terminated polyurethane, which are moisture- and heat-crosslinkable, and lead after crosslinking to pressure-sensitive adhesives possessing good adhesive properties. Now, owing to the reactivity of these polyurethanes in the presence of (atmospheric) humidity, or more generally in the presence of compounds possessing a labile hydrogen atom such as amines or alcohols, it is difficult to formulate these polyurethanes in the form of a composition that is stable in storage, and therefore it is often necessary to use two-component systems (or kits) that allow the polyurethane to be synthesized at the very last moment just before using the composition. In general, these two-component systems allow separate storage of the reactants necessary for synthesis of the polyurethane, namely the polyol(s) on the one hand, and the polyisocyanate(s) on the other hand, optionally in the presence of other ingredients, and mixing of these reactants just before using the composition. The adhesive composition obtained is therefore prepared at the very last moment just before its application on a support. However, this manner of preparation requires additional effort for manipulation and is complicated for the user to carry out, especially when the reactants or the composition to be prepared have a relatively high viscosity at room temperature (23° C.).

Another drawback of the adhesive compositions based on reactive polyurethane is that they often comprise a large amount of diisocyanate compounds of low molecular weight derived from diisocyanate monomers (of molecular weight below 300 g/mol) used in excess and that did not react during synthesis of the polyurethane. It has been observed that most of the crosslinkable hot-melt adhesive compositions of the prior art based on NCO terminated polyurethane are formulated from polyurethane obtained directly after synthesis, and so contain all of the residual (unreacted) diisocyanate monomers after synthesis of the polyurethane. At the end, the adhesive composition may comprise variable amounts of diisocyanate monomers, which may lead to a certain number of problems, among them a risk of toxicity for humans and their environment.

In fact, when it is envisaged to use reactive glues based on NCO terminated polyurethane in the production of adhesive films for sealing flexible packaging intended for food products, it is desirable for these glues to contain reduced contents of isocyanate monomers as the latter are liable to migrate through the layers of flexible packaging and contaminate the foodstuffs contained in the packaging or in contact with the latter.

The presence of a high content of free diisocyanate monomers may generate emissions that are toxic to humans and their environment during use of the adhesive composition, notably during hot application of the latter. For effectively combating this exposure to the monomers, special measures must be taken, for example provision of suitable systems for extraction or ventilation, and temperature control. However, this generates additional costs and constraints that run counter to the provision of an industrial production process that is economical and cost-effective.

Notably owing to the drawbacks mentioned above, most regulations require the labelling of any product having a content of certain diisocyanate compounds of molecular weight below 300 g/mol, expressed in percentage by weight, above a certain permitted limit. For the aliphatic diisocyanates such as hexamethylene diisocyanate (HDI, with molecular weight equal to about 168 g/mol) or isophorone diisocyanate (IPDI, with molecular weight equal to about 222 g/mol), this maximum content has been fixed at 0.5 wt % of the product; and for the aromatic diisocyanates such as toluene diisocyanate (TDI, with molecular weight equal to about 174 g/mol) or diisocyanato-diphenylmethane (MDI, with molecular weight equal to about 250 g/mol), this value has been lowered to 0.1 wt % of the product, as the latter are known to form, in contact with moisture, aromatic primary amines that are potentially harmful to health. The amount of these diisocyanates and of their corresponding amines may be evaluated in a manner that is well known by a person skilled in the art using tests performed in standard conditions.

In fact, it is desirable to provide adhesive compositions comprising a content of diisocyanate, and more precisely of residual diisocyanate monomer, below the aforementioned labelling thresholds, so as to reduce the risks of exposure to these compounds during use thereof.

Various solutions have been envisaged for reducing the content of diisocyanate monomer after synthesis of polyurethane. However, these solutions that are envisaged add purification steps, which are generally expensive and undesirable. Moreover, lowering the content of diisocyanate monomer leads to a significant increase in the viscosity of the polyurethane, which may make formulation or application of the latter difficult.

Moisture- and heat-crosslinkable hot-melt adhesive compositions comprising an NCO terminated polyurethane, obtained from a polyol having a degree of unsaturation below 0.02 milliequivalent per gram, and a polyisocyanate, it being possible to combine said polyurethane with a variety of tackifying resins, are known from international application WO 00/43432.

However, these compositions are not completely satisfactory, notably with respect to the required advantages mentioned above. In fact, these compositions comprise relatively high contents of unreacted diisocyanate monomers, and often employ a tin-based reaction and crosslinking catalyst such as tin dibutyl dilaurate (DBTL), which is potentially toxic. Moreover, these compositions present problems of compatibility between the polyurethane and the tackifying resins, leading on the one hand to adhesive compositions that are not homogeneous before crosslinking and on the other hand to adhesives that are heterogeneous and have poor performance in terms of adhesion after crosslinking.

Thus, there is a need to be able to formulate moisture- and heat-crosslinkable adhesive compositions based on NCO terminated polyurethane, which lead after coating on a support and then crosslinking, to a pressure-sensitive adhesive that does not have one or more of the aforementioned drawbacks.

In particular, there is a need to be able to formulate compositions with a very low content of diisocyanate monomer of low molecular weight, notably below the labelling thresholds in the regulations, and which lead to pressure-sensitive adhesives that possess adhesive power and/or tack that is comparable, or even improved, relative to the adhesives of the prior art.

There is also a need to find solvent-free adhesive compositions, safe for humans and the environment, possessing a particularly low content by weight of diisocyanate monomer, below that of the prior art.

Moreover, there is a need to provide adhesive compositions that are ready to use (called single-component), sufficiently stable in storage, that do not have to be formulated in the form of a two-component system.

It has now been found that the composition according to the present application meets these needs wholly or partly. In particular, the adhesive composition according to the invention does not have the drawbacks of the prior art, and notably does not have a problem of incompatibility between the polyurethane and the tackifying resin used.

It was found notably that the particular combination according to the present application, combining a particular reactive polyurethane, a particular phenolic tackifying resin, and a crosslinking catalyst, at particular contents, led to homogeneous pressure-sensitive adhesives having improved adhesive power and a reduced content of diisocyanate monomer relative to the adhesives of the prior art, while still displaying immediate tackiness and a satisfactory appearance. The adhesive compositions according to the invention are transparent.

Moreover, it was found that this combination could be prepared using a method of preparation that does not require any step of separation or of purification of the residual diisocyanate monomers resulting from the polyurethane synthesis reaction, and had a residual content of diisocyanate monomers that is particularly low from the standpoint of the regulations.

The present invention therefore relates firstly to an adhesive composition comprising:
a) from 40 to 60 wt % of at least one polyurethane obtainable by polyaddition reaction:
of at least one aromatic or aliphatic diisocyanate selected from the following diisocyanates, and mixture thereof:
  a1) isophorone diisocyanate (IPDI),
  a2) 2,4-toluene diisocyanate (2,4-TDI),
  a3) diphenylmethane-2,4'-diisocyanate (2,4'-MDI),
  a4) an allophanate derivative of hexamethylene diisocyanate (HDI) of formula (I):

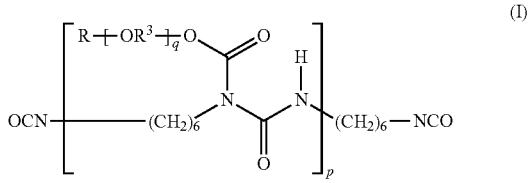

(I)

in which:

p is an integer in the range from 1 to 2;

q is an integer in the range from 0 to 9, and preferably 2 to 5;

R represents a hydrocarbon chain, saturated or unsaturated, cyclic or acyclic, linear or branched, comprising from 1 to 20 carbon atoms, preferably from 6 to 14 carbon atoms;

$R^3$ represents a divalent alkylene group, linear or branched, having from 2 to 4 carbon atoms, and preferably a divalent propylene group;

with at least one polyether diol, with or without the presence of at least one reaction catalyst, at a reaction temperature T1 below 95° C. and preferably in the range from 65° C. to 80° C., in anhydrous conditions, and in amounts of diisocyanate(s) and of polyether diol(s) leading to an NCO/OH molar ratio, designated $r_1$, in the range from 1.6 to 1.9, preferably from 1.65 to 1.85;

b) from 39 to 59 wt % of at least one compatible tackifying resin, with a number-average molecular weight in the range from 200 Da to 5000 Da, and selected from the resins obtainable by one of the following methods:

b1) polymerization of terpene hydrocarbons in the presence of Friedel-Crafts catalysts, followed by a reaction with phenols, b2) polymerization of alpha-methylstyrene, followed by a reaction with phenols; and c) from 0.01 to 1 wt % of at least one crosslinking catalyst, said percentages being expressed by weight relative to the total weight of the adhesive composition.

Other aims and features of the present invention will become clearer on reading the description and examples.

In the present application, unless stated otherwise:

the amounts expressed as percentages correspond to percentages weight/weight; in particular "wt %" is used as the abbreviation of "% by weight";

the number-average molecular weights, expressed in gram per mole (g/mol), are determined by calculation, by analysis of the content of end groups (NCO or OH) expressed in milliequivalent per gram (meq/g) and the functionality (number of NCO or OH functions per mole) of the entity considered (polyurethane used according to the invention, polyether diol or block of the corresponding polyether);

the number-average and weight-average molecular weights, expressed in dalton (Da), are determined by gel permeation chromatography (GPC), the column being calibrated with standards of PolyEthylene Glycol (PEG);

"cyclic" means that the hydrocarbon chain comprises in its structure one or more hydrocarbon rings, which may be aromatic or aliphatic, such as rings having from 5 to 6 carbon atoms;

"diisocyanate monomer" denotes any bifunctional isocyanate compound, i.e. comprising two isocyanate NCO groups (or functions), aliphatic or aromatic, used as reactant in the synthesis of a polyurethane, and having a molecular weight below 300 g/mol, and notably in the range from 100 to 270 g/mol.

Polyurethane a):

The polyurethane used according to the invention preferably has a viscosity in the range from 10 000 to 100 000 mPa·s (millipascal second) at 23° C., and more preferably a viscosity below 50 000 mPa·s.

This viscosity can be measured using a Brookfield viscosimeter according to standard ISO 2555. Typically, measurement may be carried out at 23° C., using a Brookfield RVT viscosimeter, with a number 6 needle at a rotary speed of 20 revolutions per minute (rev/min).

The diisocyanate(s) usable for preparing the polyurethane used according to the invention may be selected from the following aliphatic or aromatic diisocyanates, and a mixture thereof:

a1) isophorone diisocyanate (IPDI) (in which the percentage by weight of isocyanate group is equal to about 38 wt % relative to the weight of IPDI), a2) 2,4-toluene diisocyanate (2,4-TDI) (in which the percentage by weight of isocyanate group is equal to about 48 wt % relative to the weight of 2,4-TDI), a3) diphenylmethane-2,4'-diisocyanate (2,4'-MDI) (in which the percentage by weight of isocyanate group is equal to about 34 wt % relative to the weight of 2,4'-MDI), a4) an allophanate derivative of hexamethylene diisocyanate (HDI) of formula (I) as described above, in which p, q, R and R are selected such that the allophanate derivative of HDI of formula (I) comprises a content of isocyanate NCO group in the range from 12 to 14 wt % relative to the weight of said derivative.

Preferably, the diisocyanate(s) usable for preparing the polyurethane used according to the invention is (are) selected from the following diisocyanates, and mixture thereof:

a1) isophorone diisocyanate (IPDI), a2) 2,4-toluene diisocyanate (2,4-TDI), a4) an allophanate derivative of hexamethylene diisocyanate (HDI) of formula (I) as described above, in which:

p is an integer in the range from 1 to 2;

q is an integer in the range from 2 to 5;

R represents a hydrocarbon chain, saturated or unsaturated, cyclic or acyclic, linear or branched, comprising from 6 to 14 carbon atoms;

$R^3$ represents a divalent propylene group;

p, q, R and $R^3$ are selected such that the allophanate derivative of HDI of formula (I) comprises a content of isocyanate group in the range from 12 to 14 wt % relative to the weight of said derivative.

The diisocyanate(s) usable for preparing the polyurethane used according to the invention (mentioned in a2, a3 and a4 above) may be used in the form of a mixture containing essentially said diisocyanate(s) and a low content of residual diisocyanate compound(s) resulting from synthesis of said diisocyanate(s). The content of residual diisocyanate compound(s) that is tolerated (corresponding to the isomers of 2,4-TDI, of 2,4'-MDI and to HDI respectively) is such that using said mixture in the preparation of the polyurethane according to the invention has no effect on the final properties of the polyurethane.

For example, the diisocyanate(s) usable for preparing the polyurethane used according to the invention (mentioned in a2, a3 and a4 above) may be used in the form of a mixture containing at least 99 wt % of diisocyanate(s) and less than 1 wt % of residual diisocyanate compound(s), preferably in the form of a mixture containing at least 99.5 wt % of diisocyanate(s) and less than 0.5 wt % of residual diisocyanate compound(s), more preferably in the form of a mixture containing at least 99.8 wt % of diisocyanate(s) and less than 0.2 wt % of residual diisocyanate compound(s), relative to the weight of said mixture.

Preferably, the content of residual diisocyanate monomer is such that the content by weight of isocyanate group in said mixture remains equal to about that indicated above relative to the weight of the diisocyanate a2, a3 and a4 alone.

Thus, 2,4-TDI as mentioned in a2) may be used in the form of a technical TDI, available commercially, corresponding to a composition whose content of 2,4-TDI is of at least 99 wt %, and preferably of at least 99.5 wt %, relative to the weight of said composition.

The 2,4'-MDI as mentioned in a3) may be used in the form of a technical MDI, available commercially, corresponding to a composition whose content of 2,4'-MDI is of at least 99 wt %, and preferably of at least 99.5 wt %, relative to the weight of said composition.

The allophanate derivative of HDI of formula (I) as mentioned in a4) may be used in the form of a composition in which it is comprised at a level of at least 99.5 wt %, preferably at least 99.8 wt %, said composition comprising less than 0.5 wt % of HDI, preferably less than 0.2 wt % of HDI, relative to the total weight of said composition. Such a composition may be obtained for example by:

- carbamation reaction ranging from 80 to 100° C., of a saturated or unsaturated, acyclic, linear or branched monohydric alcohol, comprising from 1 to 20 carbon atoms, and alkoxylated, whose alkylene part is linear or branched and comprises from 1 to 4 carbon atoms, with a first HDI monomer, in an NCO/OH molar ratio greater than 2, advantageously greater than 4, preferably greater than 8, and then
- allophanatation reaction at a temperature in the range from 100 to 180° C., preferably around 140° C., of the carbamate compound obtained with a second HDI monomer, in an NCO/OH molar ratio from 5 to 20, and
- distillation of the unreacted HDI monomers, in order to obtain a reactant comprising less than 0.5 wt % of HDI, preferably less than 0.2 wt % of HDI.

According to a first preferred embodiment, the diisocyanate(s) usable for preparing the polyurethane used according to the invention is (are) selected from the aliphatic or aromatic diisocyanates mentioned in a1), a2) and a3) in any one of the above paragraphs, alone or mixed.

According to a second preferred embodiment, the diisocyanate(s) usable for preparing the polyurethane used according to the invention is (are) selected from the aliphatic diisocyanates mentioned in a4) in any one of the above paragraphs, alone or mixed.

The diisocyanates usable for preparing the polyurethane used according to the invention are widely available commercially. As an example, we may mention "Scuranate® T100" marketed by the company Vencorex, corresponding to a 2,4-TDI of purity above 99 wt %, "Desmodur® I" marketed by the company Bayer, corresponding to an IPDI, or else those of the "Tolonate®" series marketed by the company Vencorex, such as "Tolonate® X FLO 100" corresponding to a composition comprising at least 99.5 wt % of allophanate derivative of HDI of formula (I) and less than 0.5 wt % of HDI relative to the weight of said composition.

The polyether diol(s) usable according to the invention may be selected from those whose number-average molecular weight is from 2000 to 12000 g/mol, preferably from 3500 to 8500 g/mol, and more preferably from 3500 to 6000 g/mol. Use of such polyether diols leads to a polyurethane generally having a number-average molecular weight in the range from 3000 to 21000 g/mol, preferably 4600 to 16800 g/mol, and better still from 4600 to 14000 g/mol. Such polyether diols are preferably linear.

Preferably, the polyether diol(s) usable according to the invention is (are) selected from the polyoxyalkylene diols, whose alkylene part, linear or branched, comprises from 2 to 4 carbon atoms, preferably 3 carbon atoms such as polyoxypropylene diol.

Preferably, the polyether diol(s) usable according to the invention has (have) a hydroxyl value (OHN) in the range from 9 to 56 mg KOH/g, and preferably from 13 to 32 mg KOH/g and more preferably from 18 to 32 mg KOH/g. Here, the hydroxyl value represents the number of hydroxyl functions per gram of polyether diol and is expressed in the text of the present application in the form of the equivalent number of milligrams of potash (KOH) used in the determination of the hydroxyl functions.

Preferably, the polyether diol(s) usable according to the invention has (have) a polydispersity index (PDI) in the range from 1 to 1.4 and preferably from 1 to 1.2. More preferably, polyoxypropylene diol is used having a polydispersity index in the range from 1 to 1.4 and preferably from 1 to 1.2. This index corresponds to the ratio of the weight-average molecular weight to the number-average molecular weight of the diol (PDI=Mw/Mn) determined by GPC.

Polyether diols of this kind are marketed under the name "Acclaim®" by the company Bayer, such as "Acclaim® 12200" with number-average molecular weight close to 11335 g/mol and with hydroxyl value in the range from 9 to 11 mg KOH/g, "Acclaim® 8200" with number-average molecular weight close to 8057 g/mol and with hydroxyl value in the range from 13 to 15 mg KOH/g, and "Acclaim® 4200" with number-average molecular weight close to 4020 g/mol, and with hydroxyl value in the range from 26.5 to 29.5 mg KOH/g.

Moreover, the polyether diols usable according to the invention may be obtained, as is known, by polymerization of the corresponding alkylene oxide in the presence of a catalyst based on a metal-cyanide double complex.

The polyurethane used according to the invention is obtainable by the method of preparation as described above.

According to a first embodiment, the polyurethane used according to the invention is obtainable by polyaddition of at least one aromatic or aliphatic diisocyanate selected from those mentioned in a1), a2) and a3) in any one of the above paragraphs with a polyether diol, preferably as described in any one of the preceding paragraphs, with or without the presence of at least one reaction catalyst, at a reaction temperature T1 below 95° C. and preferably in the range from 65° C. to 80° C., in anhydrous conditions, and in amounts of diisocyanate(s) and of polyether diol leading to an NCO/OH molar ratio, designated $r_1$, in the range from 1.6 to 1.9, preferably from 1.65 to 1.85.

According to a second embodiment, the polyurethane used according to the invention is obtainable by polyaddition:

- of at least one aliphatic diisocyanate selected from those mentioned in a4) in any one of the above paragraphs, used in the form of a composition in which it is comprised at a rate of at least 99.5 wt %, said composition comprising less than 0.5 wt % of HDI relative to the total weight of said composition,
- with a polyether diol, preferably as described in any one of the preceding paragraphs,
- with or without the presence of at least one reaction catalyst, at a reaction temperature T1 below 95° C. and preferably in the range from 65° C. to 80° C., in anhydrous conditions, and in amounts of diisocyanate(s) and of polyether diol leading to an NCO/OH molar ratio, designated $r_1$, in the range from 1.6 to 1.9, preferably from 1.65 to 1.85.

Preferably, the polyurethane used according to the invention is obtained by polyaddition of one or two aromatic or aliphatic diisocyanates selected from those mentioned in a1), a2), a3), a4), as described in any one of the preceding paragraphs, with one or two polyether diols, preferably as described in any one of the preceding paragraphs, with or without the presence of at least one reaction catalyst, at a reaction temperature T1 below 95° C. and preferably in the range from 65° C. and 80° C., in anhydrous conditions, and in amounts of diisocyanate(s) and of polyether diol(s) leading to an NCO/OH molar ratio, designated $r_1$, in the range from 1.6 to 1.9, preferably from 1.65 to 1.85.

More preferably, the polyurethane used according to the invention is obtained by polyaddition of an aromatic or aliphatic diisocyanate selected from those mentioned in a1), a2), a3), a4), as described in any one of the preceding paragraphs, with a polyether diol, preferably as described in any one of the preceding paragraphs, with or without the presence of at least one reaction catalyst, at a reaction temperature T1 below 95° C. and preferably in the range from 65° C. to 80° C., in anhydrous conditions, and in amounts of diisocyanate and of polyether diol leading to an NCO/OH molar ratio, designated $r_1$, in the range from 1.6 to 1.9, preferably from 1.65 to 1.85.

The reaction between said diisocyanate(s) and said polyether diol(s) preferably takes place at a reaction temperature T1 in the range from 65° C. to 80° C., allowing the desired polyurethane to be obtained within reasonable periods of time, notably for application of the production of polyurethane on an industrial scale.

"NCO/OH molar ratio" means the molar ratio of the number of isocyanate groups to the number of hydroxyl groups of the diisocyanate and diol reactants used for synthesis of the polyurethane.

The aforementioned set of conditions for obtaining the polyurethane used according to the invention makes it possible to obtain a particularly low concentration of unreacted diisocyanate monomer at the end of reaction and a polyurethane displaying the physicochemical properties required for obtaining, in combination with the other ingredients mentioned in b) and c), a heat- and moisture-crosslinkable hot-melt adhesive composition displaying satisfactory adhesive performance.

The adhesive composition according to the invention may thus advantageously comprise less than 0.5 wt %, preferably less than 0.3 wt %, of (each) aliphatic diisocyanate monomer (optionally present in the adhesive composition), and/or less than 0.1 wt %, preferably less than 0.06 wt %, of (each) aromatic diisocyanate monomer (optionally present in the adhesive composition), relative to the total weight of the adhesive composition, depending on whether the polyurethane used according to the invention was obtained from aromatic and/or aliphatic diisocyanate(s).

The principle of the method of analysis for determining the concentration of free diisocyanate monomers is based on the specific reaction of the isocyanate group NCO with an amine (1-(2-methoxyphenyl)piperazine or PPZ) to form stable derivatives of urea. These derivatives are obtained during preparation of the sample of adhesive by dilution/dissolution of this sample using a solution of acetonitrile at 0.02 mol/L of PPZ. The derivatives of PZZ formed from the isocyanates contained in the sample to be analysed are then determined by a system for reverse-phase high-performance liquid chromatography (HPLC) on C18 with a gradient of mobile phase comprising a mixture of water and acetonitrile buffered with an aqueous solution of tetrabutylammonium bisulphate at 0.2 wt %, at a pH in the range from 2 to 3, equipped with an ultraviolet (UV) detector operating at 254 nm. These compounds are identified and quantified by comparing their retention time and their chromatographic peak areas with those of the standard PPZ derivatives obtained by reaction of a diisocyanate monomer of known nature and concentration.

The adhesive composition according to the invention may also have a content of NCO group (also denoted by "NCO level", designated % NCO) that may be in the range from 0.15 to 1.7 wt %, preferably in the range from 0.2 to 1.1 wt %, relative to the total weight of the adhesive composition. These isocyanate groups correspond to those carried by the NCO terminated polyurethane and those carried by the other isocyanate compounds present in the adhesive composition, such as the unreacted diisocyanate monomers. This NCO level can be calculated in a manner familiar to a person skilled in the art and gives, to a first approximation, an indication of the capacity of the polyurethane present in the adhesive composition for subsequent crosslinking in contact with moisture.

When this level is too low, the polyurethane does not crosslink sufficiently to obtain good adhesive properties. When this level is too high, the crosslinked adhesive composition is too rigid and therefore leads, once crosslinked, to an adhesive with little or no self-adhesive properties.

According to a third embodiment, the polyurethane used according to the invention has a number-average molecular weight in the range from 3000 to 21000 g/mol, and is obtainable by polyaddition of an aromatic or aliphatic diisocyanate selected from those mentioned in a1), a2), a3), a4), as described in any one of the preceding paragraphs, with a polyether diol with a number-average molecular weight in the range from 2000 to 12000 g/mol, preferably selected from the polyoxyalkylene diols, whose alkylene part, linear or branched, comprises from 2 to 4 carbon atoms, preferably 3 carbon atoms such as polyoxypropylene diol, with or without the presence of at least one reaction catalyst, at a reaction temperature T1 below 95° C. and preferably in the range from 65° C. to 80° C., in anhydrous conditions, and in amounts of diisocyanate and of polyether diol leading to an NCO/OH molar ratio, designated $r_1$, in the range from 1.6 to 1.9.

According to a preferred variant of this third embodiment, the polyurethane used according to the invention has a number-average molecular weight in the range from 4600 to 16800 g/mol, and is obtainable by polyaddition of an aromatic or aliphatic diisocyanate selected from those mentioned in a1), a2), a3), a4), as described in any one of the preceding paragraphs, with a polyether diol with a number-average molecular weight in the range from 3500 to 8500 g/mol, preferably selected from the polyoxyalkylene diols, whose alkylene part, linear or branched, comprises from 2 to 4 carbon atoms, and better still 3 carbon atoms such as polyoxypropylene diol, with or without the presence of at least one reaction catalyst, at a reaction temperature T1 below 95° C. and preferably in the range from 65° C. to 80° C., in anhydrous conditions, and in amounts of diisocyanate and of polyether diol leading to an NCO/OH molar ratio, designated $r_1$, in the range from 1.6 to 1.9.

According to a more preferred variant of this third embodiment, the polyurethane used according to the invention has a number-average molecular weight in the range from 4600 to 14000 g/mol, and is obtainable by polyaddition of an aromatic or aliphatic diisocyanate as described in any one of the preceding paragraphs, with a polyether diol with a number-average molecular weight in the range from 3500 to 6000 g/mol, preferably selected from the polyoxyalkylene diols, whose alkylene part, linear or branched, comprises from 2 to 4 carbon atoms, preferably 3 carbon atoms such as polyoxypropylene diol, with or without the presence of at least one reaction catalyst, at a reaction temperature T1 below 95° C. and preferably in the range from 65° C. to 80° C., in anhydrous conditions, and in amounts of diisocyanate and of polyether diol leading to an NCO/OH molar ratio, designated $r_1$, in the range from 1.6 to 1.9.

The polyurethane used according to the invention, obtainable according to this third embodiment, may be represented by the following formula (II):

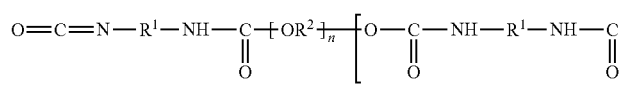
(II)

in which:
 $R^1$ represents a divalent group selected from one of the following aliphatic or aromatic divalent groups, corresponding respectively to the aliphatic or aromatic diisocyanates mentioned above in a1), a2), a3) and a4):

a1') the divalent group derived from isophorone diisocyanate (IPDI):

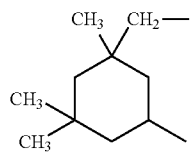

a2') the divalent group derived from 2,4-toluene diisocyanate (2,4-TDI):

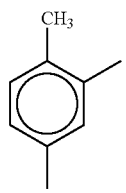

a3') the divalent group derived from diphenylmethane-2,4'-diisocyanate (2,4'-MDI):

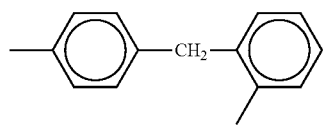

a4') the divalent group derived from an allophanate of hexamethylene diisocyanate (HDI) of the following formula (III):

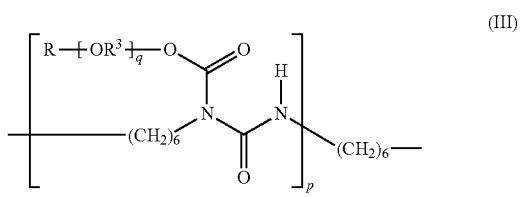
(III)

in which:
 p is an integer in the range from 1 to 2;
 q is an integer in the range from 0 to 9, and preferably from 2 to 5;
 R represents a hydrocarbon chain, saturated or unsaturated, cyclic or acyclic, linear or branched, comprising from 1 to 20 carbon atoms, preferably from 6 to 14 carbon atoms;
 $R^3$ represents a divalent alkylene group, linear or branched, having from 2 to 4 carbon atoms; and preferably a divalent propylene group;
 $R^2$, which may be identical to or different from $R^3$, represents a divalent alkylene group, linear or branched, having from 2 to 4 carbon atoms; and preferably a divalent propylene group;
 n is a non-zero integer such that the number-average molecular weight of the polyether block of formula —[$OR^2$]$_n$— is in the range from 2000 to 12000 g/mol, and preferably from 3500 to 8500 g/mol, and better still from 3500 to 6000 g/mol;
 m is an integer such that the number-average molecular weight of the polyurethane is in the range from 3000 to 21000 g/mol, preferably 4600 to 16800 g/mol, and better still from 4600 to 14000 g/mol.

In particular, $R^1$ may represent a divalent group selected from one of the following aliphatic or aromatic divalent groups:
 a1') the divalent group derived from isophorone diisocyanate (IPDI),
 a2') the divalent group derived from 2,4-toluene diisocyanate (2,4-TDI),
 a3') the divalent group derived from diphenylmethane-2,4'-diisocyanate (2,4'-MDI),
 a4') the divalent group derived from an allophanate of hexamethylene diisocyanate (HDI) of formula (III) in which:
  p is an integer in the range from 1 to 2;
  q is an integer in the range from 0 to 9, and preferably from 2 to 5;
  R represents a hydrocarbon chain, saturated or unsaturated, cyclic or acyclic, linear or branched, comprising from 1 to 20 carbon atoms, preferably from 6 to 14 carbon atoms;
  $R^3$ represents a divalent alkylene group, linear or branched, having from 2 to 4 carbon atoms; and preferably a divalent propylene group;
  p, q, R and $R^3$ are selected such that the corresponding allophanate derivative of HDI of formula (I) comprises a content of isocyanate group in the range from 12 to 14 wt % relative to the total weight of said derivative.

Preferably, $R^1$ represents a divalent group selected from one of the following aliphatic or aromatic divalent groups:

a1') the divalent group derived from isophorone diisocyanate (IPDI), a2') the divalent group derived from 2,4-toluene diisocyanate (2,4-TDI), a3') the divalent group derived from diphenylmethane-2,4'-diisocyanate (2,4'-MDI), a4') the divalent group derived from an allophanate of hexamethylene diisocyanate (HDI) of formula (III) in which:

p is an integer in the range from 1 to 2;
q is an integer in the range from 2 to 5;
R represents a hydrocarbon chain, saturated or unsaturated, cyclic or acyclic, linear or branched, comprising from 6 to 14 carbon atoms;
$R^3$ represents a divalent propylene group;
p, q, R and $R^3$ are selected such that the corresponding allophanate derivative of HDI of formula (I) comprises a content of isocyanate group in the range from 12 to 14 wt % relative to the total weight of said derivative.

The reaction catalyst(s) usable may be any catalyst known by a person skilled in the art to catalyse the formation of polyurethane by reaction of at least one diisocyanate and at least one polyether diol, with the proviso of not catalysing the reaction between the hydroxyl function of the phenolic tackifying resin and the isocyanate groups of the NCO terminated polyurethane.

Preferably, one or more catalysts selected from the catalysts presenting little or no risk of toxicity are used. In particular, the reaction catalyst or catalysts are selected from:

the organometallic derivatives of bismuth, such as bismuth neodecanoate sold under the name "Borchikat®315" by the company OM Group, bismuth carboxylate sold under the name "K-KAT® XC B221" by the company King Industries, the organometallic derivatives of tin other than tin dibutyl dilaurate, for example tin dioctyl dilaurate (DOTL) such as is sold under the name "TIB® KAT 217" by the company "TIB Chemical", the organometallic derivatives of zinc, such as zinc carboxylate sold under the name "Borchikat®22" by the company OM Group, the organometallic derivatives of titanium, such as titanium tetrabutylate $Ti(OCH_2CH_2CH_2CH_3)_4$, titanium ethylacetoacetate sold under the name "Tyzor® PITA" by the company Dupont, the organometallic derivatives of zirconium, such as the zirconium chelate sold under the name "K-KAT® A209", zirconium acetylacetonate $(Zr(acac)_4)$, and zirconium tetraethanolate $Zr(OCH_2CH_3)_4$, and mixture thereof.

An amount up to 0.3 wt % of reaction catalyst(s) may be present in the adhesive composition. In particular, it is preferable to use from 0.02 to 0.3 wt % of reaction catalyst(s) relative to the total weight of the adhesive composition.

Tackifying Resin b):

"Compatible tackifying resin" denotes a tackifying resin which, when it is mixed in proportions of 50/50 wt % with the polyurethane used according to the invention, gives a substantially homogeneous mixture. In particular, the mixture remains transparent (in the spectrum of visible light-wavelength in the range from 380 to 780 nanometers, measured in vacuum) and no phase shift or total or partial gelation is observed in the polyurethane/resin mixture.

Preferably, the compatible tackifying resin(s) usable according to the invention has (have) a softening point in the range from 70° C. to 150° C., preferably in the range from 75° C. to 130° C.

Preferably, the adhesive composition according to the invention comprises a compatible tackifying resin that may be obtained by method b1) or b2) as defined above.

Tackifying Resin b1):

The compatible tackifying resin or resins that may be obtained by method b1) as defined above may have a glass transition temperature in the range from 50° C. to 110° C., preferably in the range from 55° C. to 90° C., and more preferably in the range from 60° C. to 85° C.

The compatible tackifying resin or resins that may be obtained by method b1) as defined above may have a softening point in the range from 100° C. to 125° C., preferably from 110° C. to 125° C., and more preferably from 115° C. to 120° C.

The softening temperature (or point) of the resin can be determined according to the standardized test ASTM E 28, the principle of which is as follows. A brass ring with a diameter of about 2 cm is filled with the test resin in the molten state. After cooling to room temperature, the ring and the solid resin are placed horizontally in a thermostatically controlled bath of glycerin, the temperature of which may vary by 5° C. per minute. A steel ball with a diameter of about 9.5 mm is placed on the centre of the disk of solid resin. The softening point is, during the phase of temperature rise of the bath at a rate of 5° C. per minute, the temperature at which the disk of resin flows from a height of 25.4 mm under the weight of the ball.

The compatible tackifying resin or resins that may be obtained by method b1) as defined above may have a number-average molecular weight Mn in the range from 470 to 700 Da, preferably from 500 to 600 Da.

The compatible tackifying resin or resins that may be obtained by method b1) as defined above may comprise a hydroxyl value in the range from 40 to 160 mg KOH/g, preferably in the range from 50 to 155 mg KOH/g, and more preferably from 90 to 150 mg KOH/g.

Tackifying Resin b2):

Preferably a compatible tackifying resin is used, selected from those obtainable by method b2), when a reaction catalyst, as described above for example, is used for preparing the polyurethane used according to the invention.

The compatible tackifying resin or resins that may be obtained by method b2) as defined above preferably comprises (comprise) a softening point in the range from 75 to 120° C., more preferably from 90 to 110° C. This softening point can be measured according to the standardized test ASTM E 28.

The compatible tackifying resin or resins that may be obtained by method b2) as defined above may comprise a number-average molecular weight in the range from 650 to 1740 Da, preferably from 650 to 1100 Da, more preferably from 750 to 1050 Da, and better still from 950 to 1020 Da.

According to a first variant, the compatible tackifying resin or resins that may be obtained by method b2) as defined above may comprise a hydroxyl value in the range from 4 to 15 mg KOH/g.

According to a second variant, the compatible tackifying resin or resins that may be obtained by method b2) as defined above may comprise a hydroxyl value in the range from 25 to 50 mg KOH/g, The compatible tackifying resin or resins that may be obtained by method b2) as defined above may comprise a polydispersity index in the range from 1.2 to 1.8, preferably in the range from 1.4 to 1.7.

The tackifying resins usable according to the invention are available commercially, and among those obtainable by one of the methods b1) and b2) defined above, we may mention the following products:

method b1): "Dertophene® H150" available from the company DRT with molecular weight equal to about 630 Da, having a softening point of 118° C. and a hydroxyl value in the range from 135 to 150 mg KOH/g;

method b2): "Sylvarez® 510" available from the company Arizona Chemical with a number-average molecular weight of about 1740 Da, a softening point of 95° C.; and "Sylvares® 525" also available from the company Arizona Chemical with a number-average molecular weight of about 1010 Da, a softening point of 75° C., and a hydroxyl value of about 4 mg KOH/g.

According to an especially preferred embodiment, the adhesive composition according to the invention comprises:

a) from 40 to 60 wt % of a polyurethane obtainable by polyaddition of 2,4-TDI, with a polyether diol, with or without the presence of at least one reaction catalyst, at a reaction temperature T1 below 95° C. and preferably in the range from 65° C. to 80° C., in anhydrous conditions, and in amounts of TDI and of polyether diol leading to an NCO/OH molar ratio, designated $r_1$, in the range from 1.6 to 1.9, preferably from 1.65 to 1.85;

b) from 39 to 59 wt % of a compatible tackifying resin, with a number-average molecular weight in the range from 200 Da to 5000 Da, and selected from the resins obtainable by method b2); and c) from 0.01 to 1 wt % of at least one crosslinking catalyst, relative to the total weight of the adhesive composition.

According to a variant of this especially preferred embodiment, the adhesive composition according to the invention comprises:

a) from 40 to 60 wt % of a polyurethane of formula (II), in which:
$R^1$ represents the divalent group derived from 2,4-TDI,
$R^2$ represents the divalent propylene group,
n is a non-zero integer such that the number-average molecular weight of the polyether block of formula —[$OR^2$]$_n$— is in the range from 3500 to 8500 g/mol, and better still from 3500 to 6000 g/mol,
m is an integer such that the number-average molecular weight of the polyurethane is in the range from 4600 to 16800 g/mol, and better still from 4600 to 14000 g/mol;

b) from 39 to 59 wt % of a compatible tackifying resin, with a number-average molecular weight in the range from 200 Da to 5000 Da, and selected from the resins obtainable by method b2); and c) from 0.01 to 1 wt % of at least one crosslinking catalyst, relative to the total weight of the adhesive composition.

The adhesive compositions as defined in these particularly preferred embodiments of the invention make it possible, once coated on a support layer, for example polymeric, and then crosslinked with moisture and by heating, to obtain a pressure-sensitive adhesive seal that is particularly adherent and resistant to rupture. In fact, when the adhesive seal is glued on a substrate, and then submitted to a detaching force, it detaches without breaking. There is "adhesive rupture" of the adhesive seal relative to the substrate. The breaking strength may be evaluated by standard adherence tests, such as those described in the examples of the present application, on various substrates, for example glass, metal, etc.

Crosslinking Catalyst c):

The crosslinking catalyst or catalysts used in the adhesive composition according to the invention may be any catalyst known by a person skilled in the art to catalyse the formation of urea by reaction of a diisocyanate in the presence of water (moisture). Preferably, these catalysts are selected from catalysts not containing tin. For example, one or more tertiary amine catalysts may be used, such as:

1,8-diazabicyclo[5.4.0]undec-7-ene (DBU)

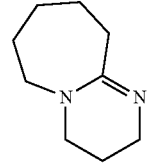 [SMILES: C1CCC2=NCCCN2CC1]

1,5-diazabicyclo[4.3.0]non-5-ene (DBN)

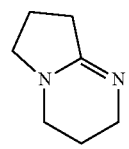

2,2'-dimorpholinoethyl ether (DMDEE)

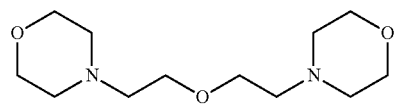 [SMILES: C1CN(CCOCCN2CCOCC2)CCO1]

1,4-diazabicyclo[2.2.2]octane (DABCO)

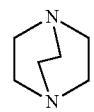

These crosslinking catalysts have the advantage of not being carcinogenic, mutagenic and reprotoxic (CMR). Among these crosslinking catalysts, DBU is preferably used.

An amount from 0.1 to 2% of one or more stabilizers (or antioxidants) may further be included for example in the adhesive composition according to the invention. These compounds are added to protect the composition from degradation resulting from reaction with oxygen, which is liable to form by the action of heat, light or residual catalysts on certain raw materials such as the tackifying resins. These compounds may include primary antioxidants, which trap the free radicals and are generally sterically hindered primary phenolic compounds substituted with methyl and/or tert-butyl groups such as "Irganox®1076" from BASF (octadecyl-3-(3,5-di-tert-butyl-4-hydroxyphenyl)propionate), "Irganox®1010" from BASF (pentaerythritol tetrakis (3-(3, 5-di-tert-butyl-4-hydroxyphenyl)propionate), "Irganox®245" from BASF (ethylene bis(oxyethylene) bis (3-(5-tert-butyl-4-hydroxy-m-tolylpropionate). The primary antioxidants may be used alone or in combination with other antioxidants such as phosphites such as "Irgafos®168" also from BASF (tris (2,4-di-tert-butylphenyl)phosphite), or else with UV stabilizers such as amines.

The adhesive composition according to the invention may also include one or more additives selected appropriately so as not to degrade the properties of the crosslinked adhesive. Among the additives that may be used, we may mention pigments, dyes and fillers. These additives may be selected from those usually employed in adhesive compositions. However, the adhesive composition according to the invention preferably does not comprise thermoplastic polymers such as ethylene vinyl acetate (EVA), or plasticizer.

Preferably, the adhesive composition does not comprise an organic solvent with boiling point below 250° C. at atmospheric pressure, such as ethyl acetate, xylene, toluene, N-methyl-2-pyrrolidone (NMP).

More particularly, the adhesive composition consists of:
a) from 40 to 60 wt % of at least one polyurethane as defined in any one of the preceding paragraphs,
b) from 39 to 59 wt % of at least one compatible tackifying resin as defined in any one of the preceding paragraphs,
c) up to 0.3 wt % of at least one reaction catalyst,
d) from 0.01 to 1 wt % of at least one crosslinking catalyst,
e) less than 0.5 wt % of aliphatic diisocyanate monomer(s),
f) less than 0.1 wt % of aromatic diisocyanate monomer(s),
g) less than 2 wt % of at least one stabilizer or antioxidant, and
h) optionally at least one additive selected from pigments, dyes and fillers.

According to this preferred embodiment, the nature of the compounds a) to h) and their content are as defined in one of the preceding paragraphs. Thus, the content by weight of (each) aliphatic diisocyanate monomer(s) optionally present in the composition, namely IPDI and/or HDI, preferably represents less than 0.3% of the weight of the composition, and the content by weight of (each) aromatic diisocyanate monomer(s) optionally present in the composition, namely TDI and/or MDI, preferably represents less than 0.06% of the weight of the composition.

According to this preferred embodiment, the adhesive composition according to the invention preferably has a viscosity in the range from 1000 to 50 000 mPa·s at 100° C., and preferably a viscosity in the range from 4000 to 15 000 mPa·s at 100° C. This viscosity can be measured at 100° C. using a Brookfield RVT viscosimeter coupled to a heating module of the Thermosel type made by Brookfield, with a number 27 spindle at a rotary speed of 20 revolutions per minute.

The invention further relates to a method of preparing an adhesive composition according to the invention, characterized in that the polyurethane(s) used according to the invention is (are) prepared beforehand, and then mixed with the other compounds of the adhesive composition.

According to a preferred variant according to the invention, the method of preparing the adhesive composition according to the invention comprises, in the following order:
(i) a step of melting the tackifying resin or resins, if necessary mixed with one or more thermal stabilizers or antioxidants, at a temperature T2,
(ii) a step of incorporating and of mixing the polyurethane or polyurethanes, away from the air, under inert atmosphere,
(iii) a step of cooling said mixture, to a temperature T3 below T2, and then,
(iv) a step of incorporating, in said mixture, the crosslinking catalyst or catalysts, and if applicable, the optional other compound or compounds.

Step (i) generally takes place at a temperature T2 above or equal to the softening point of the tackifying resin, and in the case of a mixture of resin, at a temperature T2 above or equal to the highest of the softening points of the resins used. In particular, the temperature T2 moreover does not exceed 150° C., preferably 130° C. Preferably, the temperature T2 is above or equal to the softening point of the tackifying resin, and in the case of a resin mixture, at a temperature T2 above or equal to the highest of the softening points of the resins used, and is in the range from 70° C. to 150° C., more preferably from 75° C. to 130° C.

In step (ii), the polyurethane or polyurethanes may be added in portions. In fact, the total amount of polyurethane(s) to be introduced may be split into as many portions as is necessary so as to avoid an excessive temperature drop of the mixture, associated with introduction of a large volume of polyurethane(s), causing the reaction mixture to congeal.

Between each of the preceding steps, a step of dehydration under vacuum may be introduced, notably before and after adding the polyurethane, so as to work in optimum anhydrous conditions. Each dehydration step may be carried out under a reduced pressure of 10 to 50 millibars (mbar), for a time in the range from one hour thirty minutes to three hours and preferably at least two hours.

Step (iii) generally takes place at a temperature T3 below the softening point of the tackifying resin, and in the case of a mixture of tackifying resins, at a temperature T3 below the highest of the softening points of the resins used. In particular, temperature T3 is moreover at least 45° C. Preferably, the temperature T3 is below the softening point of the tackifying resin, and in the case of a mixture of tackifying resins, at a temperature T3 below the highest of the softening points of the resins used, and is in the range from 45° C. to 90° C., more preferably from 70° C. to 80° C.

The present invention also relates to a self-adhesive support obtainable by a method comprising the following steps:
(i') preheating the adhesive composition as defined above to a temperature T4 in order to make it liquid, and then
(ii') coating said adhesive composition on a support layer, and then
(iii') crosslinking said adhesive composition by heating the coated support to a temperature T5 in the range from 70° C. to 150° C., preferably from 75° C. to 130° C., in the presence of (atmospheric) humidity, and preferably a relative humidity between 40 and 70% at 23° C.

Step (i') generally takes place at a temperature T4 in the range from 70° C. to 150° C., more preferably from 75° C. to 130° C.

Step (ii') of coating the support layer is carried out by means of known coating devices, for example a lip-type nozzle or the curtain type, roll coater or a manual coating device also called film-pull or filmograph.

It employs a basis weight of adhesive composition in the range from 20 to 100 g/m$^2$.

The material usable for the support layer is for example paper or a film of a polymer material with one or more layers. As an example, we may mention a substrate of PolyEthylene Terephthalate (PET).

The time required for the crosslinking in step (iii') may vary over a wide range, for example between 1 second and 15 minutes.

This step of thermal crosslinking combined with a subsequent step of crosslinking in the presence of (atmospheric) humidity (and preferably a relative humidity between 40 and 70% at 23° C.) has the effect of creating—between the polymer chains of the polyurethane used according to the invention, and under the action of the (atmospheric) humidity—bonds of the urea type, which lead to the formation of a three-dimensional polymer network. The adhesive composition thus crosslinked is a pressure-sensitive adhesive, which confers the desired adhesive power and tack on the support layer that is coated with it.

Thus, a PET support coated at a basis weight of 50 g/m² displays permanent adhesion on a stainless steel substrate corresponding to an adhesive power (measured by the peel test at 180° on stainless steel described below) advantageously greater than 2 N/cm, preferably in the range from 2 to 20 N/cm, in cohesive or adhesive rupture, and more preferably in adhesive rupture. The tack of this same support at room temperature (measured by the instantaneous loop adhesion test described below) is advantageously greater than 2 N/cm, preferably in the range from 2 to 35 N/cm, in cohesive or adhesive rupture, and more preferably in adhesive rupture.

The terms "cohesive rupture" and "adhesive rupture" represent the appearance of the fracture surface after detachment of the adhesive seal from the substrate or support. "Cohesive rupture" means that the separation fracture between the detached materials appeared within the glued joint. "Adhesive rupture" means that the separation fracture between the detached materials appeared outside the glued joint, so that the adhesive remains glued to one of the interfaces between the glued joint and one of the materials assembled by gluing.

Finally, the glued joint formed after applying the support layer coated with the crosslinked composition on a substrate ensures fixation of said support layer in a temperature range from −60 C. to +160° C.

The self-adhesive support according to the invention may also comprise a protective non-stick layer covering the layer of PSA, said protective layer being simply laminated.

The present invention also relates to the use of the self-adhesive support defined above for making labels and/or self-adhesive tapes.

The basis weight of adhesive composition required for making self-adhesive labels may range from 20 to 100 g/m², preferably around 50 g/m². That required for making self-adhesive tapes may vary much more widely, in the range from 2 to 1000 g/m², preferably from 15 to 250 g/m².

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding application No. FR 13/62993, filed Dec. 19, 2013 are incorporated by reference herein.

The following examples are given purely for illustrating the invention and are not to be interpreted as limiting its scope.

Examples 1 to 7 illustrate preparation of a polyurethane used according to the invention.

Examples 1A to 7A illustrate adhesive compositions according to the invention comprising the polyurethane obtained in examples 1 to 7 respectively.

Examples 8A to 10A correspond to comparative compositions (designated with the abbreviation comp) comprising the polyurethane obtained in example 3, but a tackifying resin different from that used according to the invention:

"Kristalex® F100"=polymer of hydrogenated alpha-methylstyrene, sold by the company Eastman Chemical, having a softening point of 99° C., "Sylvalite® RE 105 XL"=rosin ester, sold by the company Arizona Chemical, having a softening point of 105° C., "Acrynax® 4326"=acrylic resin, sold by the company Franklin Adhesives & Polymers, having a softening point in the range from 70° C. to 80° C.

Example 11A corresponds to an adhesive composition prepared according to the prior art (example 2 of application WO 0043432).

"Kristalex®3085"=hydrocarbon resin of alpha-methylstyrene, sold by the company Eastman Chemical, having a softening point in the range from 70° C. to 80° C.

EXAMPLES 1 TO 7

Preparation of the Polyurethanes

Polyurethanes 1 to 7 of examples 1 to 7 were prepared identically using the various ingredients shown in Table 1. The amounts of diisocyanate and of diol used correspond to an NCO/OH molar ratio in the range from about 1.7 to 1.8.

The amounts shown in Table 1 are expressed in grams.

Experimental Protocol:

The diisocyanate and the diol, and if applicable the reaction catalyst, are mixed in a reactor, stirring continuously, under nitrogen, at a temperature T1 in the range from 72 to 80° C. The temperature is controlled so that it does not exceed 80° C.

The progress of the reaction is monitored by measuring the NCO level by back-titration of dibutylamine, using hydrochloric acid according to standard NF T52-132. The reaction is stopped when the measured "NCO level" is roughly equal to the desired NCO level.

TABLE 1

| Ingredients of the polyurethane | 1 | 2 | 3 | 4 | 5 | 6 | 7 |
|---|---|---|---|---|---|---|---|
| Acclaim ® 8200 | — | 750 | — | — | — | — | — |
| Acclaim ® 4200 | 929 | — | 929 | 912 | 912 | 929 | 412 |
| Scuranate ® T100 | 71 | 28 | 71 | — | — | 71 | — |
| Tolonate ® X FLO 100 | — | — | — | — | — | — | 118 |
| IPDI | — | — | — | 88 | 88 | — | — |
| Borchikat ® 315 | — | — | 0.1 | 0.1 | 0.1 | — | 0.05 |
| TIB Kat ® 217 | — | — | — | — | — | 0.1 | — |

Characterization:

For each of the polyurethanes obtained in examples 1 to 7:

the NCO level in the polyurethane synthesis medium is determined according to standard NF T52-132. The measured values are expressed in percentage by weight relative to a 100-gram sample, are then referred to the total weight of the adhesive composition and are presented in Table 4.

the content by weight of unreacted diisocyanate monomer present in the polyurethane synthesis medium is measured by HPLC equipped with a UV detector as described above (reverse phase on C18, mobile phase: aqueous solution of acetonitrile, buffered with an aqueous solution at 0.2 wt % of tetrabutylammonium bisulphate to pH equal to 2.5, detection wavelength: 254 nm). The values measured are expressed in percentage by weight and are then referred to the total weight of the adhesive composition and are presented in Table 4.

the viscosity of the polyurethane is estimated by measuring the viscosity of the polyurethane synthesis medium at 23° C. at the end of the reaction. This measurement is carried out 24 hours after the end of reaction (J+1) at 23° C., using a Brookfield RVT viscosimeter, with a number 6 needle at a rotary speed of 20 revolutions per minute (rev/min). The value measured is expressed in millipascal second (mPa·s) and is presented in Table 2.

TABLE 2

| Characterization of the polyurethane | 1 | 2 | 3 | 4 | 5 | 6 | 7 |
|---|---|---|---|---|---|---|---|
| Viscosity at 23° C. (mPa · s) | 8710 | 10800 | 19500 | 25920 | 25920 | 18400 | 83400 |

EXAMPLES 1A TO 10A

Preparation of the Adhesive Compositions

Compositions 1A to 10A were prepared identically using the various ingredients shown in Table 3. In particular, these compositions were prepared from the polyurethanes obtained in examples 1 to 7 without undergoing a purification step or separation of the residual diisocyanate, not consumed by the polyurethane synthesis reaction. In other words, these compositions were prepared from the polyurethanes of the examples (designated 1 to 7) comprising the corresponding unreacted diisocyanate monomer, which represents less than 0.1% of the weight of the polyurethane (for examples 1-3 and 6) and less than 0.5 wt % of the polyurethane (for examples 4-5 and 7). The concentrations of unreacted diisocyanate monomer were measured according to the method described above in the description.

The amounts shown in Table 3 are expressed in grams.

Experimental Protocol:

Composition 1A is prepared firstly by putting the tackifying resin and the antioxidants in a glass reactor under vacuum, heated to a temperature T2 above or equal to the softening point of the tackifying resin and less than or equal to 130° C. Then, once the resin is properly molten, the vacuum is switched off and half of the polyurethane composition obtained in the preceding example 1 is introduced, under nitrogen. The mixture is maintained at a temperature T2 as defined above, stirring continuously. After addition, the mixture is stirred under vacuum for at least 2 hours, and then the vacuum is switched off again and the other half of the polyurethane composition 1 is introduced under nitrogen, stirring the mixture at a temperature T2 as defined above. Then the mixture is cooled to temperature T3, at about 80° C., the vacuum is switched off and then the catalyst is introduced under a nitrogen atmosphere, stirring vigorously. After addition, the vacuum is restored and the mixture is stirred for a further 10 minutes.

The composition obtained is stored in a moisture-proof aluminium cartridge previously stove-dried at 100° C.

The experimental protocol applied for example 1A is reproduced identically for examples 2A to 10A taking Table 3 into account.

TABLE 3

| Ingredients of the adhesive composition | 1A | 2A | 3A | 4A | 5A | 6A | 7A | 8A (comp) | 9A (comp) | 10A (comp) |
|---|---|---|---|---|---|---|---|---|---|---|
| Polyurethane 1 | 52.0 | — | — | — | — | — | — | — | — | — |
| Polyurethane 2 | — | 52.1 | — | — | — | — | — | — | — | — |
| Polyurethane 3 | — | — | 52.1 | — | — | — | — | 52.1 | 52.1 | 52.1 |
| Polyurethane 4 | — | — | — | 52.1 | — | — | — | — | — | — |
| Polyurethane 5 | — | — | — | — | 52.0 | — | — | — | — | — |
| Polyurethane 6 | — | — | — | — | — | 52.0 | — | — | — | — |
| Polyurethane 7 | — | — | — | — | — | — | 52.1 | — | — | — |
| Dertophene ® H150 | 46.8 | 47.1 | — | — | — | 46.8 | — | — | — | — |
| Sylvares ® 525 | — | — | 47.1 | 47.1 | 46.8 | — | 47.1 | — | — | — |
| Kristalex ® F100 | — | — | — | — | — | — | — | — | — | 47.1 |
| Sylvalite ® RE105XL | — | — | — | — | — | — | — | 47.1 | — | — |
| Acrynax ® 4326 | — | — | — | — | — | — | — | — | 47.1 | — |
| DBU | 0.5 | 0.1 | 0.1 | 0.1 | 0.5 | 0.5 | 0.1 | 0.1 | 0.1 | 0.1 |
| Antioxidants | 0.7 | 0.7 | 0.7 | 0.7 | 0.7 | 0.7 | 0.7 | 0.7 | 0.7 | 0.7 |

Characterizations:

The following measurements are carried out identically on the various adhesive compositions 1A to 10A obtained:

The viscosity of the composition is measured at 100° C. using a Brookfield RVT viscosimeter coupled to a heating module of the Thermosel type made by Brookfield, with a number 27 spindle at a rotary speed of 20 revolutions per minute. This viscosity is expressed in millipascal·second.

In addition, the general appearance of each composition was evaluated visually (visible light). Compositions 1A to 7A are all transparent. For the comparative examples 9A and 10A, gelling of the composition was observed, probably resulting from incompatibility between the tackifying resin and the polyurethane used.

The measured values are presented in Table 4.

TABLE 4

| Characterizations of the adhesive compositions | 1A | 2A | 3A | 4A | 5A | 6A | 7A | 8A (comp) | 9A (comp) | 10A (comp) |
|---|---|---|---|---|---|---|---|---|---|---|
| Viscosity at 100° C. (mPa · s) | 8350 | 6000 | 7000 | 3000 | 3700 | 9025 | 7000 | 6100 | gel | gel |
| % NCO (in wt % of the adhesive composition) | 0.77 | 0.38 | 0.77 | 0.74 | 0.74 | 0.77 | 0.66 | 0.77 | 0.77 | 0.77 |
| Level of free monomer (wt % of the adhesive composition) | 0.04 | 0.05 | 0.04 | 0.49 | 0.49 | 0.04 | 0.3 | 0.04 | 0.04 | 0.04 |

Preparation of a PET Support Layer Coated With the Crosslinked Adhesive Composition at a Rate of 50 g/m²

The support layer used is a rectangular sheet of PolyEthylene Terephthalate (PET) with a thickness of 50 µm and dimensions of 20 cm by 40 cm.

The composition 1A obtained is preheated to a temperature T4 in the range from 70° C. to 150° C. and preferably from 100° C. to 120° C. and it is introduced into a cartridge, from where a cord is extruded, which is deposited near the edge of the sheet, parallel to its width.

The composition contained in this cord is then distributed on the entire surface of the sheet, so as to obtain a uniform layer of roughly constant thickness. This is done using a film-pull (also called filmograph) which is moved from the edge of the sheet to the opposite edge. In this way a layer is deposited with a composition corresponding to a basis weight of 50 g/m², which roughly represents a thickness of the order of 50 µm.

The sheet of PET thus coated is then put in a stove at a temperature T5 in the range from 70° C. to 150° C. and preferably from 100 to 120° C. for about 15 minutes, and then at 23° C. for 7 days at a relative humidity of 50%, for crosslinking of the composition.

The sheet is then laminated on a protective non-stick layer consisting of a sheet of silicone film, rectangular and with the same dimensions.

The PET support layer thus obtained is submitted to the tests described below.

The experimental protocol applied and the tests carried out for the multilayer system obtained using composition 1A are reproduced identically for examples 1A to 7A.

Peel Test at 180° on Stainless Steel Plate

The adhesive power is evaluated by the peel (or peeling) test at 180° on a stainless steel plate as described in FINAT method No. 1, published in the FINAT Technical Manual 6th edition, 2001. FINAT is the International Federation of manufacturers and processors of self-adhesive labels. The principle of this test is as follows.

A test specimen in the form of a rectangular strip (25 mm×150 mm) is cut from the PET support layer coated with the crosslinked composition obtained previously. This test specimen is fixed on ⅔ of its length (after removing the corresponding portion of protective non-stick layer), on a substrate consisting of a degreased stainless steel plate, applying two passes of a 1-kilogram roller. The assembly obtained is left for 15 minutes at room temperature. It is then placed in a pulling apparatus that is able, starting from the free end of the rectangular strip, to effect peeling or detachment of the strip at an angle of 180° and with a separation speed of 300 mm per minute. The apparatus measures the force required for detaching the strip in these conditions. The results are expressed in newton per centimeter (N/cm) and are shown in Table 5 below.

In addition, the fracture surface is assessed visually, according to the state of the unglued surfaces. The designation "AR" is used for adhesive rupture, when it is observed that all of the adhesive seal remains glued to the PET support layer. The designation "CR" is used for cohesive rupture, when it is observed that the adhesive seal was broken and part remained glued to the PET support layer and the other part was glued to the substrate. The results are shown in Table 5.

Instantaneous Adhesion Test (Also Called Loop Test)

The immediate tackiness or tack is evaluated by the instantaneous adhesion test, called loop test, described in FINAT method No. 9, the principle of which is as follows.

A test specimen in the form of a rectangular strip (25 mm×150 mm) is cut from the PET support layer coated with the crosslinked composition obtained previously. After removing all of the protective non-stick layer, the 2 ends of this strip are joined so as to form a loop whose adhesive layer is facing outwards. The 2 joined ends are put in the moving jaws of a pulling apparatus that is able to impose a speed of movement of 300 mm/minute along a vertical axis with possibility of going forwards and backwards. The lower part of the loop placed in the vertical position is first brought into contact with a horizontal glass plate of 25 mm by 30 mm on a square zone with side of about 25 mm. Starting from this contacting, the direction of movement of the jaws is reversed. The immediate tackiness is the maximum value of the force required for the loop to be unglued completely from the plate. The results are expressed in newton per square centimeter (N/cm²) and are shown in Table 5.

In addition, the fracture surface is assessed visually, according to the state of the unglued surfaces. The designation "AR" is used for adhesive rupture: in particular, it is observed that all of the adhesive seal remains glued to the PET support layer. The designation "CR" is used for cohesive rupture: it is observed that the adhesive seal was broken and part remained glued to the PET support layer and the other part remained glued to the substrate. The results are shown in Table 5.

TABLE 5

| Tests of the crosslinked adhesive composition on support | 1A | 2A | 3A | 4A | 5A | 6A | 7A | 8A (comp) | 9A (comp) | 10A (comp) |
|---|---|---|---|---|---|---|---|---|---|---|
| 180° peel on stainless steel (N/cm) | 11.81 CR | 3.26 CR | 9.45 AR | 18.50 CR | 10.24 CR | 10.24 CR | 6.30 CR | 0.55 CR | n.a. | n.a. |
| Instantaneous adhesion of the loop on glass (N/cm$^2$) | 12.40 CR | 4.82 CR | 6.05 AR | 2.12 CR | 11.94 CR | 12.87 CR | 7.44 CR | 1.24 CR | n.a. | n.a. | n.a.: not applicable

Thus, all the adhesives obtained from examples 1A to 7A according to the invention lead to adhesive performance that is satisfactory in terms of adhesive strength and tack. Moreover, the values obtained at the end of the peel test and after the instantaneous loop adhesion test are strictly above 2N/cm and 2N/cm$^2$ respectively, which are the minimum desired values for obtaining self-adhesive power.

For comparative example 8A, these cumulative conditions are not fulfilled, and in fact the adhesive obtained has poor performance and is not suitable as a self-adhesive.

For examples 9A and 10A, the adhesive strength and the instantaneous tackiness could not be measured as the composition had gelled.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A crosslinkable adhesive composition comprising:
a) from 40 to 60 wt % of at least one polyurethane obtainable by a polyaddition reaction:
of at least one aromatic or aliphatic diisocyanate that is:
a1) isophorone diisocyanate,
a2) 2,4-toluene diisocyanate,
a3) diphenylmethane-2,4'-diisocyanate,
a4) an allophanate derivative of hexamethylene diisocyanate of formula (I):

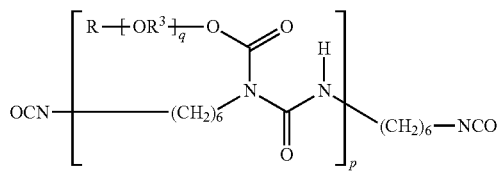

in which:
p is an integer in the range from 1 to 2;
q is an integer in the range from 0 to 9;
R represents a hydrocarbon chain, saturated or unsaturated, cyclic or acyclic, linear or branched, comprising from 1 to 20 carbon atoms;
R$^3$ represents a divalent alkylene group, linear or branched, having from 2 to 4 carbon atoms;
or a mixture of said aromatic or aliphatic diisocyanates, with at least one polyether diol, with or without the presence of at least one reaction catalyst, at a reaction temperature T1 below 95° C., in anhydrous conditions, and in amounts of diisocyanate(s) and of polyether diol(s) leading to an NCO/OH molar ratio, designated $r_1$, in the range from 1.6 to 1.9; said polyurethane having formula (II)

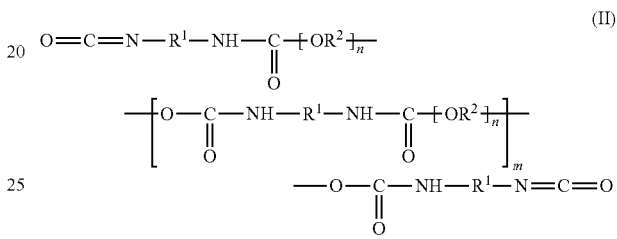

in which:
R$^1$ represents an aliphatic or aromatic divalent group:
a1') a divalent group derived from isophorone diisocyanate:

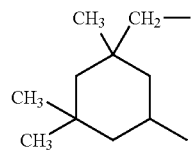

a2') a divalent group derived from 2,4-toluene diisocyanate:

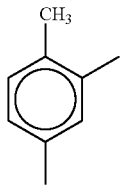

a3') a divalent group derived from diphenylmethane-2,4'-diisocyanate:

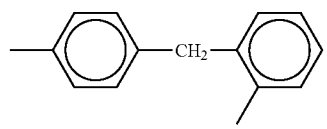

or
a4') a divalent group derived from an allophanate of hexamethylene diisocyanate (HDI) of formula (III):

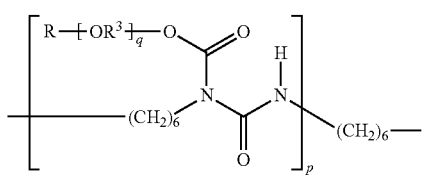

(III)

in which:
p is an integer in the range from 1 to 2;
q is an integer in the range from 0 to 9;
R represents a hydrocarbon chain, saturated or unsaturated, cyclic or acyclic, linear or branched, comprising from 1 to 20 carbon atoms;
$R^3$ represents a divalent alkylene group, linear or branched, having from 2 to 4 carbon atoms;
$R^2$, which may be identical to or different from $R^3$, represents a divalent alkylene group, linear or branched, having from 2 to 4 carbon atoms;
n is a non-zero integer such that the number-average molecular weight of the polyether block of formula $[OR^2]_n$— is in the range from 2000 to 12000 g/mol;
m is an integer such that the number-average molecular weight of the polyurethane is in the range from 3000 to 21000 g/mol;
b) from 39 to 59 wt % of at least one compatible tackifying resin, with a number-average molecular weight in the range from 200 Da to 5000 Da, and selected from the resins obtained by one of the following methods:
b1) polymerization of terpene hydrocarbons in the presence of Friedel-Crafts catalysts, followed by reaction with phenols,
b2) polymerization of alpha-methylstyrene, followed by reaction with phenols; and
c) from 0.01 to 1 wt % of at least one crosslinking catalyst, said percentages being expressed by weight relative to the total weight of the adhesive composition.

2. The adhesive composition according to claim 1, wherein the allophanate derivative of hexamethylene diisocyanate of formula (I) is in the form of a composition in which it is comprised at a level of at least 99.5 wt %, said composition comprising less than 0.5 wt % of hexamethylene diisocyanate relative to the total weight of said composition.

3. The adhesive composition according to claim 1, wherein the at least one polyether diol has a number-average molecular weight in the range from 2000 to 12000 g/mol.

4. The adhesive composition according to claim 1, wherein the at least one polyether diol is a polyoxypropylene diol with a polydispersity index in the range from 1 to 1.4.

5. The adhesive composition according to claim 1, comprising:
a) from 40 to 60 wt % of the polyurethane of formula (II), in which:
$R^1$ represents the divalent group derived from 2,4-toluene diisocyanate,
$R^2$ represents the divalent propylene group,
n is a non-zero integer such that the number-average molecular weight of the polyether block of formula $[OR^2]_n$— is in the range from 3500 to 8500 g/mol,
m is an integer such that the number-average molecular weight of the polyurethane is in the range from 4600 to 16800 g/mol;
b) from 39 to 59 wt % of the compatible tackifying resin, with a number-average molecular weight in the range from 200 Da to 5000 Da, that is a resin obtained by method b2); and
c) from 0.01 to 1 wt % of the least one crosslinking catalyst,
relative to the total weight of the adhesive composition.

6. The adhesive composition according to claim 1, comprising less than 0.5 wt % of unreacted aliphatic diisocyanate monomer, and less than 0.1 wt % of unreacted aromatic diisocyanate monomer, relative to the total weight of the adhesive composition.

7. The adhesive composition according to claim 1, having a total content of NCO group in the range from 0.15 to 1.7 wt % relative to the total weight of the adhesive composition.

8. A method of preparing a composition as defined in claim 1, comprising mixing the at least one polyurethane the at least one tackifying resin and the at least one crosslinking catalyst.

9. A self-adhesive support obtainable by a method comprising:
(i') preheating the adhesive composition as defined in claim 1 to a temperature T4, in order to make it liquid, and then
(ii') coating said adhesive composition on a support layer, and
(iii') crosslinking said adhesive composition by heating the coated support to a temperature T5 in the range from 70° C. to 150° C., in the presence of humidity.

10. A label and/or self-adhesive tape comprising the self-adhesive support as defined in claim 9.

* * * * *